(12) United States Patent
Rojas et al.

(10) Patent No.: US 6,425,123 B1
(45) Date of Patent: Jul. 23, 2002

(54) SYSTEM, METHOD, AND PROGRAM FOR TESTING TRANSLATABILITY OF SOFTWARE BY USING ENGLISH MULTI-BYTE TRANSLITERATION CREATING DOUBLE-WIDE CHARACTERS

(75) Inventors: Francis Xavier Rojas; Keiichi Yamamoto; Elizabeth Carol Meade, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,431

(22) Filed: Jun. 29, 1999

(51) Int. Cl.$^7$ ................................................ G06F 9/45
(52) U.S. Cl. .............................. 717/136; 704/2; 704/8; 704/9
(58) Field of Search ................................ 717/1, 7, 137, 717/136; 707/530, 531, 526, 536, 533, 523; 704/8, 2, 1, 5, 9, 277

(56) References Cited

U.S. PATENT DOCUMENTS

| | | | | |
|---|---|---|---|---|
| 5,225,981 A | * | 7/1993 | Yokogawa | 704/2 |
| 5,309,358 A | * | 5/1994 | Andrews et al. | 709/1 |
| 5,418,718 A | * | 5/1995 | Lim et al. | 704/8 |
| 5,499,335 A | * | 3/1996 | Silver et al. | 345/340 |
| 5,523,946 A | * | 6/1996 | Kaplan et al. | 704/2 |
| 5,583,761 A | | 12/1996 | Chou | |
| 5,649,214 A | * | 7/1997 | Bruso et al. | 704/8 |
| 5,664,206 A | | 9/1997 | Murow | |
| 5,678,039 A | * | 10/1997 | Hinks et al. | 707/4 |
| 5,787,452 A | * | 7/1998 | McKenna | 707/536 |
| 5,870,084 A | * | 2/1999 | Kanungo et al. | 345/551 |
| 5,889,481 A | * | 3/1999 | Okada | 341/50 |
| 5,903,859 A | * | 5/1999 | Stone et al. | 704/8 |
| 5,992,737 A | * | 11/1999 | Kubota | 235/380 |
| 6,024,289 A | * | 2/2000 | Ackley | 235/494 |
| 6,091,897 A | * | 7/2000 | Yates et al. | 717/8 |
| 6,092,037 A | * | 7/2000 | Stone et al. | 704/8 |
| 6,233,545 B1 | * | 5/2001 | Datig | 704/2 |
| 6,286,131 B1 | * | 9/2001 | Beers et al. | 703/22 |

OTHER PUBLICATIONS

U.S. application No. 09/342,432, Meade et al., filed Jun. 29, 1999.

U.S. application No. 09/342,433, Meade et al., filed Jun. 29, 1999.

U.S. Patent No. 6,233,545 B1; Datig; Filed May 15, 2001.

* cited by examiner

*Primary Examiner*—Gregory Morse
*Assistant Examiner*—Chameli C. Das
(74) *Attorney, Agent, or Firm*—Marilyn Smith Dawkins; Bracewell & Patterson, L.L.P.

(57) ABSTRACT

A mock translation system, method and program is provided which converts single-byte base-language data and performs a mock translation on it to produce internationalization test data which takes the form of the corresponding base-language data transliterated into and displayed using a double-byte character set to create double-wide characters. The double-wide characters take into account the spacing, i.e., field length, needed to perform an actual translation. This data is stored in localization files and displayed in a software application in place of the English or foreign-language text. By visually inspecting each screen, the programmer or proofreader is able to easily recognize many internationalization errors, without requiring the ability to read any foreign languages. These errors include truncation, alignment, or other formatting errors, and programming errors such as text that is hard-coded, localization files missing from the program build, and text missing from localization files.

14 Claims, 7 Drawing Sheets

SYSTEM, METHOD, AND PROGRAM FOR TESTING TRANSLATABILITY OF SOFTWARE BY USING ENGLISH MULTI-BYTE TRANSLITERATION CREATING DOUBLE-WIDE CHARACTERS

CROSS REFERENCE TO RELATED APPLICATIONS

This application shares common text and figures with commonly assigned, copending application Ser. No. 09/342,433 "Mock Translation Method, System, And Program to Test Software Translatability", and application Ser. No. 09/342,432 "Mock Translation System, Method, And Program Using Multi-byte Placeholder Characters to Test Translatability of Software That Will Display Multi-byte Languages", which are hereby incorporated by reference.

BACKGROUND OF THE INVENTION

1. Technical Field

The present invention generally relates to tools for developing software for international use and in particular to multi-language software development. Still more particularly, the present invention relates to a system for testing language translatability in computer software.

2. Description of the Related Art

As computers have become more prevalent, it has become desirable for software developers to be able to market their products to those people who do not speak the native language of the software developers. In particular, it is desirable that software developed in the English language be available to those persons, both in the United States and in the rest of the world, that do not speak English. Accordingly, many software applications that are developed in English are later translated for use by non-English speakers.

The process of translating a software package into another (or more than one other) language is time-consuming and expensive. Each text message, menu, and button must be translated to allow the user to operate the program. The most direct way to do this is to search the entire program source code for every text string, i.e., every string of characters that would be displayed to the user, and translate each of these to the new language.

This approach has several problems. One problem is that the use of this method means that the software must be specifically translated and compiled for each intended language. This, of course, is an expensive process in itself, and means that any change in the source code requires each language version of the code to be edited and recompiled.

One solution to this problem is the use of separate localization files, in which the text strings that are to be displayed are stored separately from the executable code itself. As the software is executed, the text for every given display screen is simply read from the localization files, in whichever language is stored in the file. In this manner, the text in the localization file can be translated without disturbing the executable, and the executable can be changed or replaced without disturbing the translated text (except, of course, that if the text to be displayed changes, the corresponding entries in the localization files must also be changed). The localization files may be in any number of formats, including compiled message catalogs, Java resource files, HTML bundles, and many others.

However the translation is handled, each screen of the program in operation must then be proofread to ensure that the translated text properly fits the display in place of the original text. Because different languages require different numbers of letters and spaces to express corresponding ideas, it is possible that the translated text will be truncated or misaligned when put in place of the original text. The programmer, who probably only speaks her native language, would be unable to reliably proof-read the translated display to ensure that the translated results are displayed properly. Therefore, it has become common practice to hire individuals with backgrounds in other languages to proofread each screen of the translated program, in each language, to be sure that the translated text isn't truncated, missing, or otherwise misformatted. These errors, of course, would not be readily apparent to one that did not speak that language.

In fact, at the time the programmer is testing the software, translations are typically unavailable. The translations are usually done much later in the software development process, and the software programmer is unable, using conventional tools, to determine if the software being developed will be able to properly handle the language translations at all.

The International Business Machines Corporation has published guidelines for software design which takes into account the typical amount of "extra" space needed to display the translation of an English word or phrase of given length; see IBM National Language Design Guide: Designing Internationalized Products (IBM, 4$^{th}$ Ed. 1996), which is hereby incorporated by reference. By following these guidelines, generally programmers are able to design screen displays with sufficient extra display space so that when another language is used (preferably by reading entries in a localization file), it will display correctly.

Even using these guidelines, it would be desirable to provide a system to allow a programmer to examine each screen for possible internationalization problems without requiring the participation of those fluent in the foreign languages.

SUMMARY OF THE INVENTION

It is therefore one object of the present invention to provide an improved tool for developing software for international use.

It is another object of the present invention to provide an improved tool for multi-language software development.

It is yet another object of the present invention to provide an improved system for testing language translatability in computer software.

The foregoing objects are achieved as is now described. A mock translation system, method and program is provided which converts single-byte base-language data, which is United States English in the preferred embodiment, and performs a mock translation on it to produce internationalization test data which takes the form of the corresponding base-language data transliterated into and displayed using a multi-byte character set, thereby creating a double-wide English character. The double-wide characters increase the spacing, i.e., field length, typically needed for translation of the text into a different language. This data is stored in localization files and displayed in a software application in place of the English or foreign-language text. By visually inspecting each screen, the programmer or proofreader is able to easily recognize many internationalization errors, without requiring the ability to read any foreign languages. These errors include display problems on the GUI or command line, such as truncation, expansion, alignment, or other formatting errors, and programming errors such as text that is hard-coded, localization files missing from the program build, or text missing from localization files. The use of multi-byte characters identifies build process problems and localization file retrieval mechanism problems in addition to presentation software problems such as fonts and those previously mentioned.

The mock translation provides an environment for testing the software that will be run using multi-byte character sets, such as are used by Asian countries. For ease of reference, multi-byte character sets will be discussed as "double-byte" characters and character sets, but those of skill in the art will recognize that these teachings apply to any character sets which use more than one byte to represent a single character. The translation of English (single-byte) software into Asian languages often results in many problems specific to double-byte text. By transliterating English text into double-byte English characters that look like wide English characters, problems can be identified by an English-speaker that would have occurred after the actual translation into an Asian language. Thus, the mock translation system tests the translatability of computer software, and aids in the internationalization of software programs.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
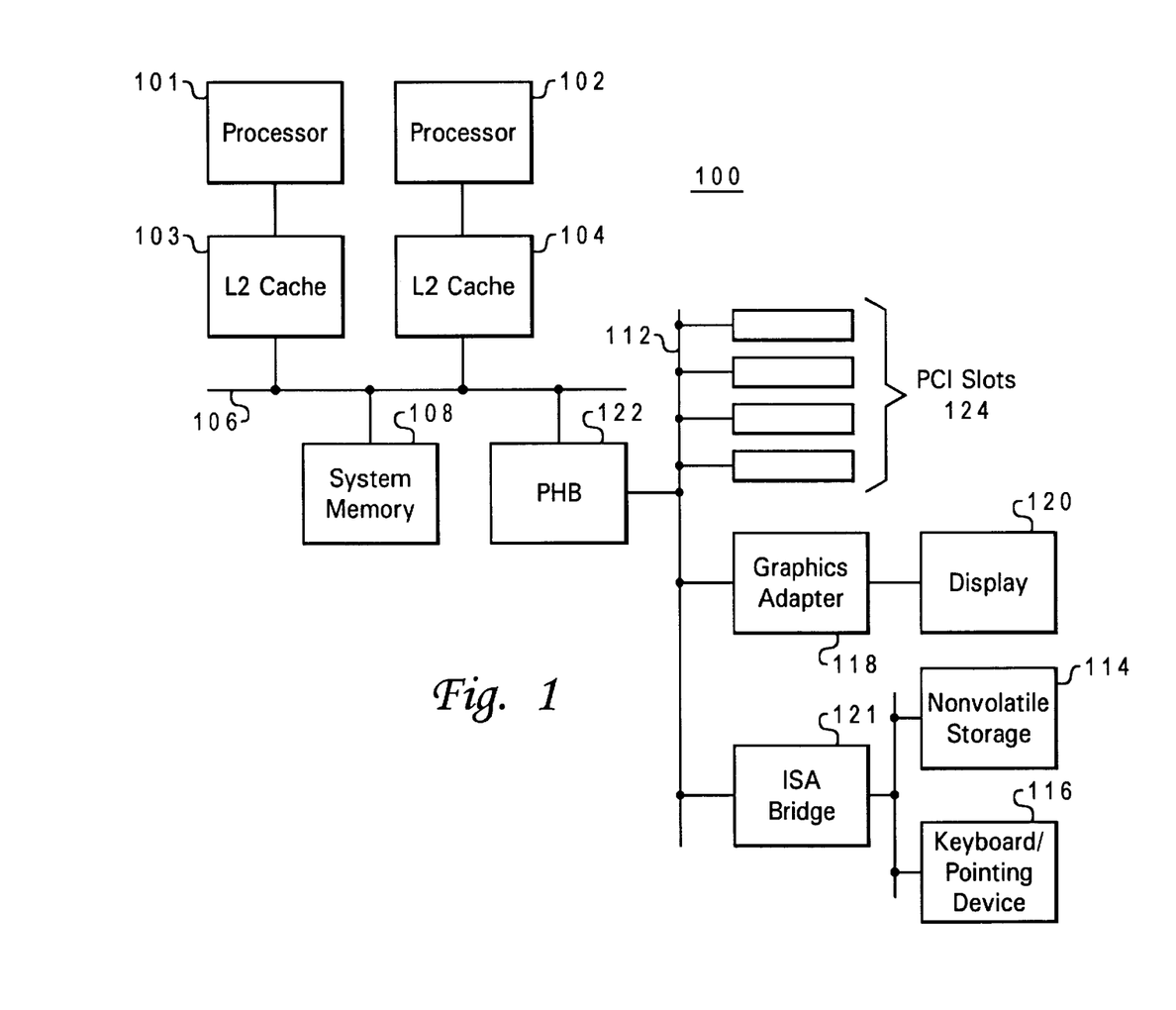
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, New York. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or network of systems, on which software applications can be executed.

According to the preferred embodiment of the invention, the text to be displayed on any screen of a software application is stored in a message catalog file (localization file) which is separate from the executable program. By doing so, the software application may be readily translated into any number of languages by simply translating the text in the localization file, without changing the executable code at all. The screen layouts of the software program are to be compatible with any language into which the package might be translated; to accomplish this, internationalization guidelines such as those published by the International Business Machines Corporation are used.

The preferred embodiment provides a tool for testing a software package which utilizes localization files. This testing tool provides an easy way for the programmer to visually inspect the software package being tested to ensure that any translated screen displays will be free of internationalization errors, without requiring programmers to read any foreign languages.

The base-language text (which will hereinafter be referred to as English for ease of reference, but which could be any language) to be displayed is placed in a localization file in a conventional manner. Instead of being translated into another language, as is conventional, a mock-translation process is executed on the localization files. For one embodiment, this mock translation process produces an output which contains, for a given English word or phrase, an open square-bracket, a string of placeholder characters, the original English word or phrase, and a close square-bracket. It should be noted, of course, that any string of readily-identifiable characters may be used in this string, as long as the beginning and end of the string are easy to spot on visual inspection. The number of placeholder characters used to preface an English word or phrase provides a desired field length to accommodate translations, and is based on the internationalization guidelines, and is, in one embodiment, as follows:

| Number of Characters in English Text | Additional Characters Added |
|---|---|
| Up to 10 | 20 |
| 11–20 | 20 |
| 21–30 | 24 |
| 31–50 | 30 |
| 51–70 | 28 |
| Over 70 | 30% of the number of characters in the English text |

This allocation of additional characters accommodates the greatest number of extra characters needed for given ranges, according to the IBM internationalization guidelines. This provides a testing method which will be effective for the widest range of potential language translations. Of course, in practice, those of skill in the art may vary these figures to fit the particular translations that will be made on the software.

Any character can be used as the placeholder character, as long as it can be easily distinguished from the text which would normally be present. In one embodiment, the tilde character (~) is used, since this character is easy to distinguish, rarely appears in standard English text, and multiple tildes are virtually never placed together in any common English usage.

The process of converting the English text into this output is referred to as a mock translation, since the output is stored in the localization file as if it were a translation according to conventional methods. The localization file is then used as if it were a standard file with a foreign translation, but the software application will display the mock translation data instead of the original text or a foreign translation.

Figure 2:
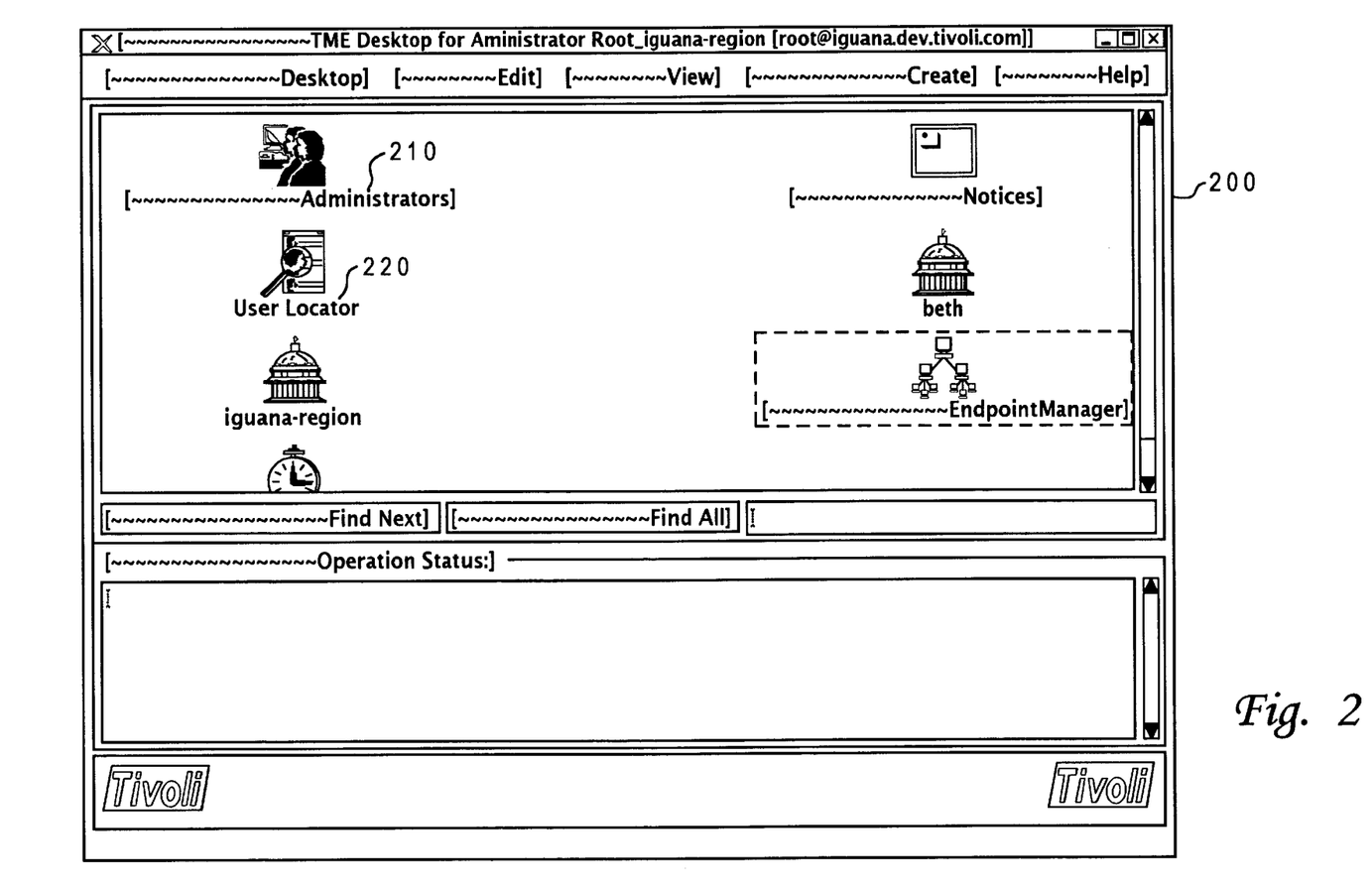
FIG. 2 is an exemplary display screen after a mock-translation process in accordance with a preferred embodiment of the invention.

Referring now to FIG. 2, since the mock translation has distinct beginning and end characters, it becomes a simple process for the user or programmer to check each screen of the executing application to determine if any characters are missing from the beginning or end of the "mock-translated" text. FIG. 2 shows an exemplary computer display 200, which has been built using mock-translated localization files. In this figure, the "Administrators" label 210 appears as it should after mock-translation. Note that the label begins with an open bracket, then a series of tilde placeholder characters appears before the English text, and then a close bracket ends the label. Here, we see that after translation to a foreign language, label 210 will display correctly. Conversely, the "UserLocator" label 220 has not been properly mock-translated, as it appears normal, without brackets or placeholder characters. Since this is the case, it is clear that label 220 would not properly translate to a foreign language; it would appear in English exactly as it does here. The mock translation has allowed this problem to be seen much earlier in the internationalization process, well before the software is actually translated. From such a visual inspection, the error can be identified as one in which the text may have been "hard-coded" into the program.

Figure 3:
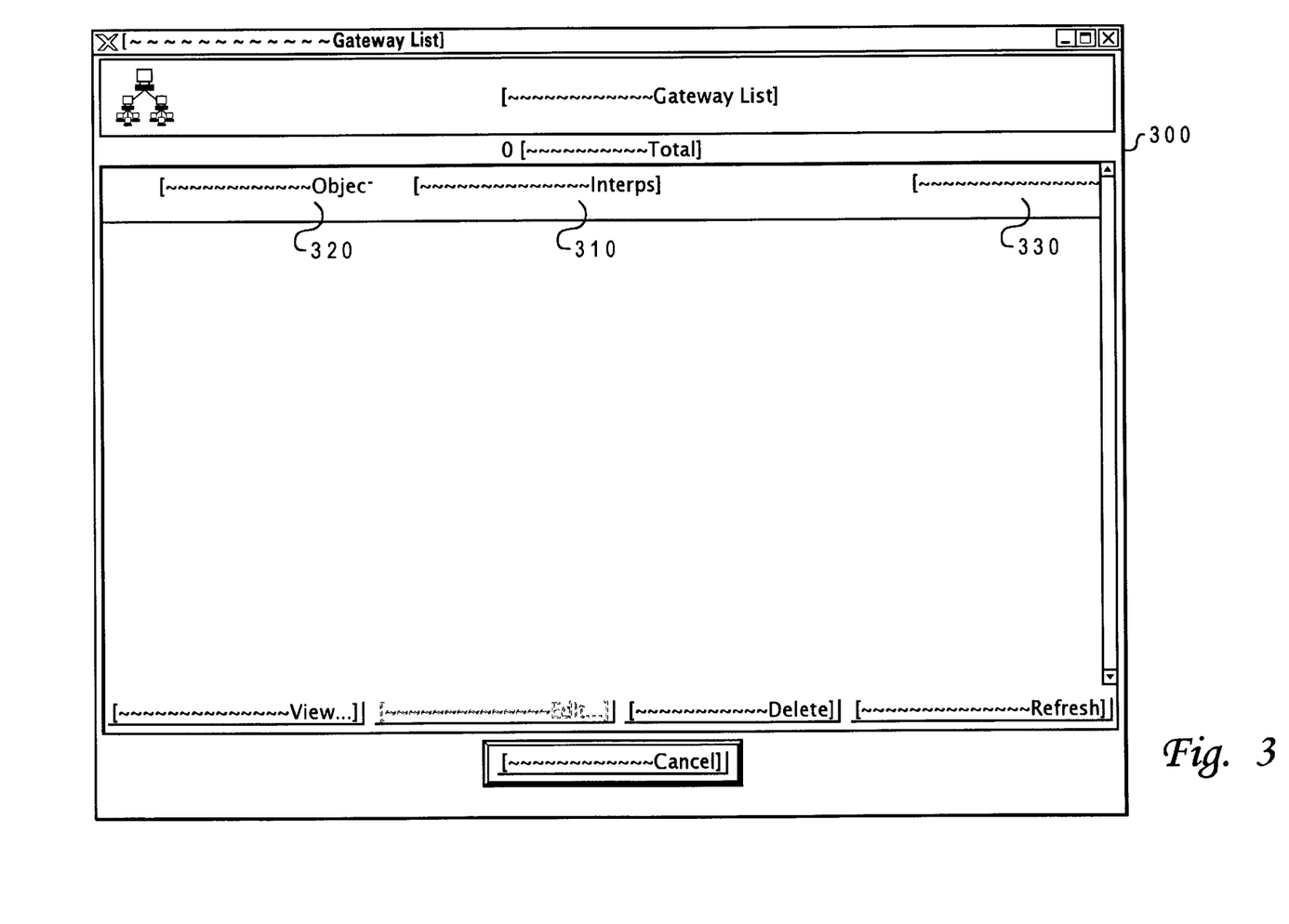
FIG. 3 depicts an exemplary display screen after a mock-translation process in accordance with a preferred embodiment of the invention, illustrating some errors.

With reference now to FIG. 3, another exemplary computer display 300 is shown. In this figure, note that the "interps" label 310 has been properly mock-translated, as described above. Label 320, however, has not been properly translated. Here, it is immediately apparent that the "Objects" label has been truncated after expansion; the open bracket and placeholder characters are present, but the English text is truncated and no close bracket appears. This type of error indicates that the programmer has not allocated enough room on the display for the translated label; while it appears correctly in English, in some languages it would show an error. Note that even if the entire English word were present, the absence of a closing bracket would indicate that in actual translation, at least the last character of the translated word could be truncated.

Label 330 shows a similar problem. Note that here, only the open bracket and the placeholder tildes are shown; this indicates that the text itself has been forced to scroll off the screen. This label must therefore be moved within the software application if it is to appear properly in the final translated product. Again, the error in label 330 is clearly apparent after the mock translation of the preferred embodiment has been performed. Without using the mock translation method, this error would simply not have appeared on-screen until after translation, and the error would therefore be very difficult to detect until very late in the software development process.

Figure 4:
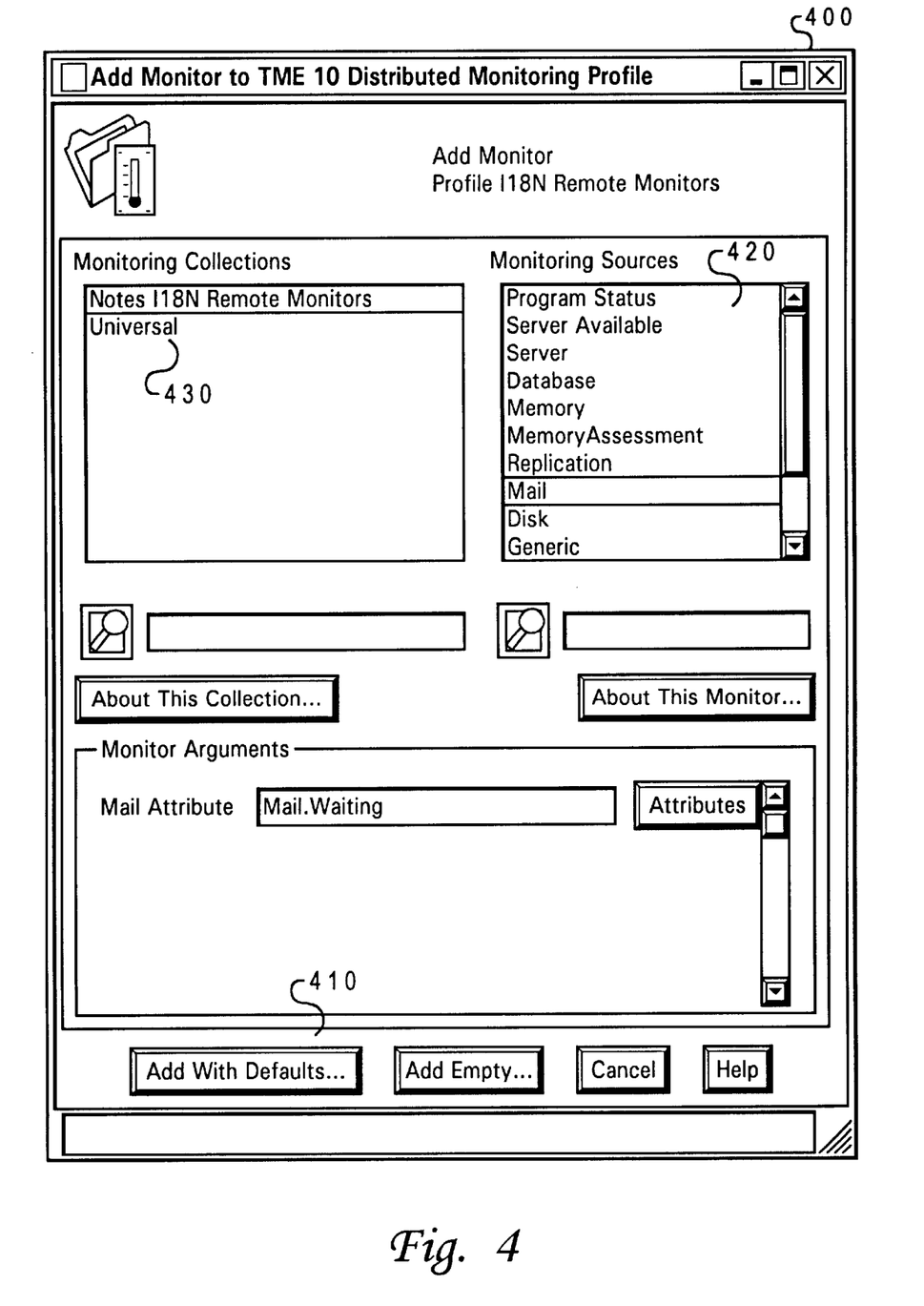
FIG. 4 is an exemplary display screen before a mock-translation process in accordance with a preferred embodiment of the invention.

FIG. 4 shows a sample application display screen 400. Note that this screen is entirely in standard English, including each of the "buttons" at the bottom of the screen, e.g., button 410, and including menu options 420.

Figure 5:
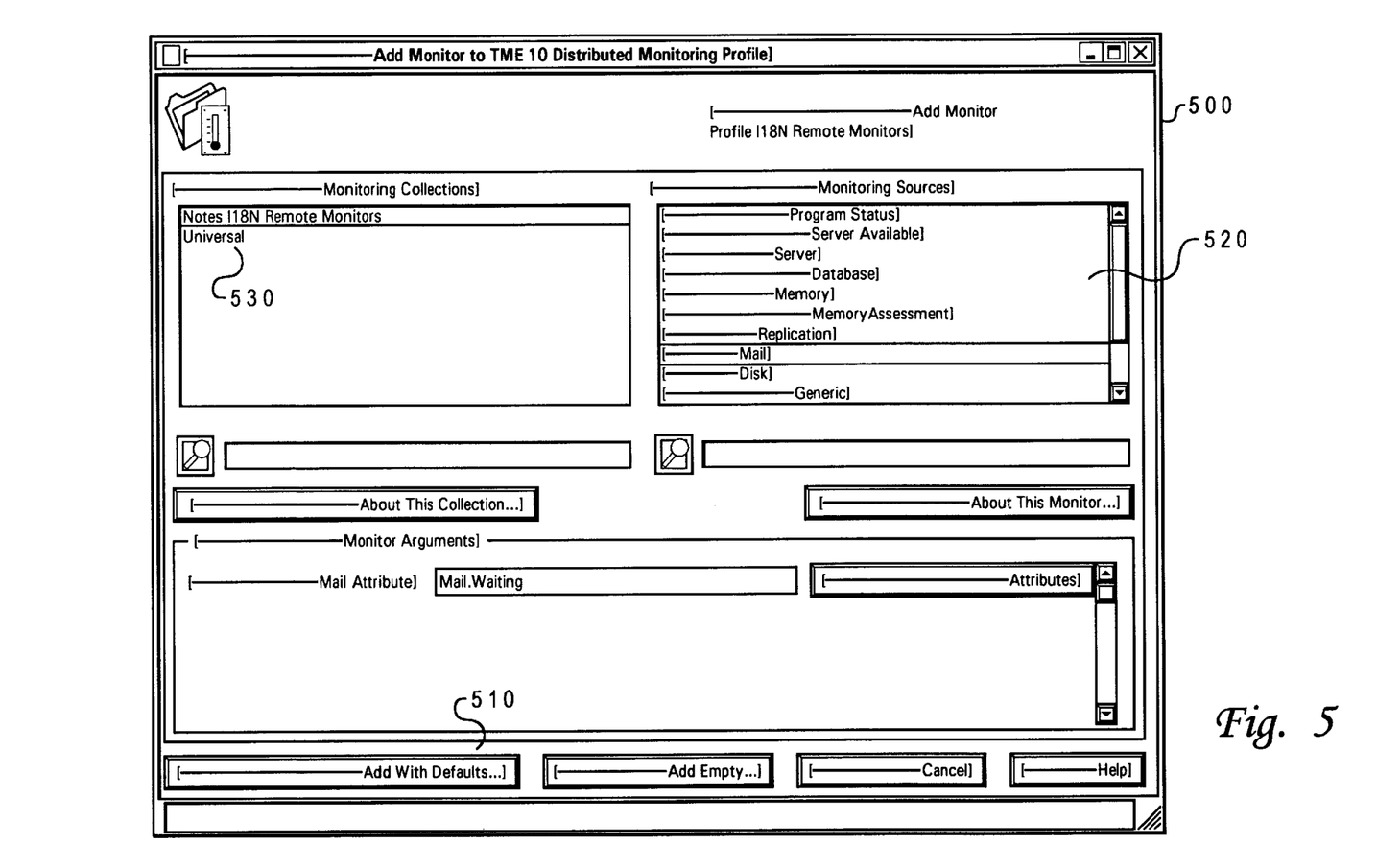
FIG. 5 depicts an exemplary display screen after a mock-translation process in accordance with another preferred embodiment of the invention, illustrating some errors.

Referring now to FIG. 5 (and with reference also to FIG. 4), since the mock translation has distinct beginning and end characters, it becomes a simple process for the user or programmer to check each screen of the executing application to determine if any characters are missing from the beginning or end of the "mock-translated" text.

Furthermore, since the mock-translated text has been expanded, using placeholder characters, to meet internationalization guidelines, it is also now a simple matter to examine each screen for alignment errors or other formatting errors.

Any hard-coded text, which has not been put through the mock-translation process, will also be apparent since there will be no beginning or end markers or placeholder characters. Note, for example, the "Add With Defaults" button. In FIG. 4, of course, this button 410 is all plain English text. In mock-translated FIG. 5, however, it is clear that corresponding button 510 has been mock translated, since brackets and placeholder characters are visible. Menu items 420 in FIG. 4 are similarly mock-translated as menu items 520 in FIG. 5. Note, conversely, that the "Universal" menu item 530 appears exactly as in FIG. 4 as menu item 430; this text has therefore been hard-coded, and this error can be easily spotted and repaired.

Another common error, not shown here, which may be easily detected using this mock-translation technique, is the presence of labels or other text which is composed of two or more separately-translated text strings. Because many foreign languages, when translated from English, will rearrange the word order of subject, objects, and verbs, each phrase to be translated should be translated as a whole if it is to be displayed correctly in other languages. For this reason, composed text must be eliminated. Using the mock-translation techniques described herein, it is a simple matter for the software programmer or developer to spot composed text, since placeholder characters will appear between words of a single string of mock-translated text. If brackets or other indicators are used to denote the beginning and/or end of the mock-translated text, the appearance of these indicators with each separate piece of text will indicate text composed of piecemeal parts.

Note that in FIGS. 4 and 5, the tilde placeholder has been replaced with a double-wide dash (--). This illustrates another innovative mock-translation technique, useful when the software is to be translated into Japanese or other languages that use double-byte character sets.

The United States and other countries which use a standard ASCII character set require only a single byte to identify individual characters. Some other languages, because they are more extensive than English, use a double-byte character set for language generation. Translation of single-byte languages into a double-byte character set for foreign use involves additional concerns because it is possible that the double-byte character may be read as two single-byte characters.

One specific (and notorious) example is the "5C" problem; many double-byte characters have "5C" as the second byte, but "5C" represents a backslash character (\) in a single-byte character set. Therefore, many double-byte characters may be incorrectly displayed as a different character followed by a backslash.

The mock translation system provides a solution to this problem, by performing a mock translation as described above, but using double-byte characters for the brackets and placeholder characters. By using a double-byte, double-wide dash character (character 815C) as the placeholder character, double-byte translation problems will also be evident on visual inspection. The double-wide dash character itself is subject to the "5C" problem, so if the display of double-byte characters is problematic, backslash characters will be visible in the placeholder character field. Note that in FIG. 5, translated menu items 520 appear correctly with placeholder dashes, and no backslash characters are visible; this indicates that the mock-translation (for these items) was performed correctly. Further, in this embodiment, the double-byte, double-wide open and close brackets can be used as field boundaries.

This process provides the advantages of the basic mock-translation system, with additional capabilities for detecting double-byte problems. Because, after mock translation, the double-byte characters will be present in the visual display of the program, any errors in the program relating to double-byte characters are immediately apparent, instead of much further down the development process, when translation of the program is usually performed. Again, the localization files remain readable to English-speakers, and now allow the software developer to easily check for internationalization problems.

Figure 7:
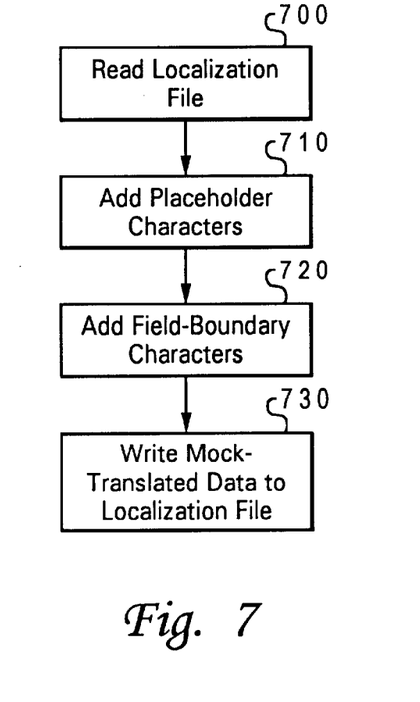
FIG. 7 depicts a flowchart of a process in accordance with a preferred embodiment of the invention.

Referring now to FIG. 7, a flowchart of a process according to the above embodiments is shown. To test the internationalization of software which uses localization files, the mock translation system first opens each of the localization files (step 700). Each entry in the file is then mock translated; first, a number of placeholder characters is added, according to internationalization guidelines (step 710). Depending on whether the double-byte technique described above is used, the placeholder characters may be single-byte characters such as the standard tilde, or may be a character such as the double-byte, double-wide dash. Next, field-boundary characters, e.g., open and close brackets, are added to the beginning and end of the entry (step 720). Again, these characters may be either single- or double-byte characters. Finally, the translated entries are written back to the localization files (step 730). Now, when the software application is run for testing, the mock-translated text will appear in place of the original text.

The preferred embodiment of this invention involves another approach to solving the double-byte problem using mock-translation techniques to replace single-byte English characters with their double-byte equivalents. Most double-byte character sets provide corresponding double-byte English characters, but these characters appear on the screen as double-wide characters, making it easy to distinguish between a single-byte English character and its double-byte equivalent.

Figure 6:
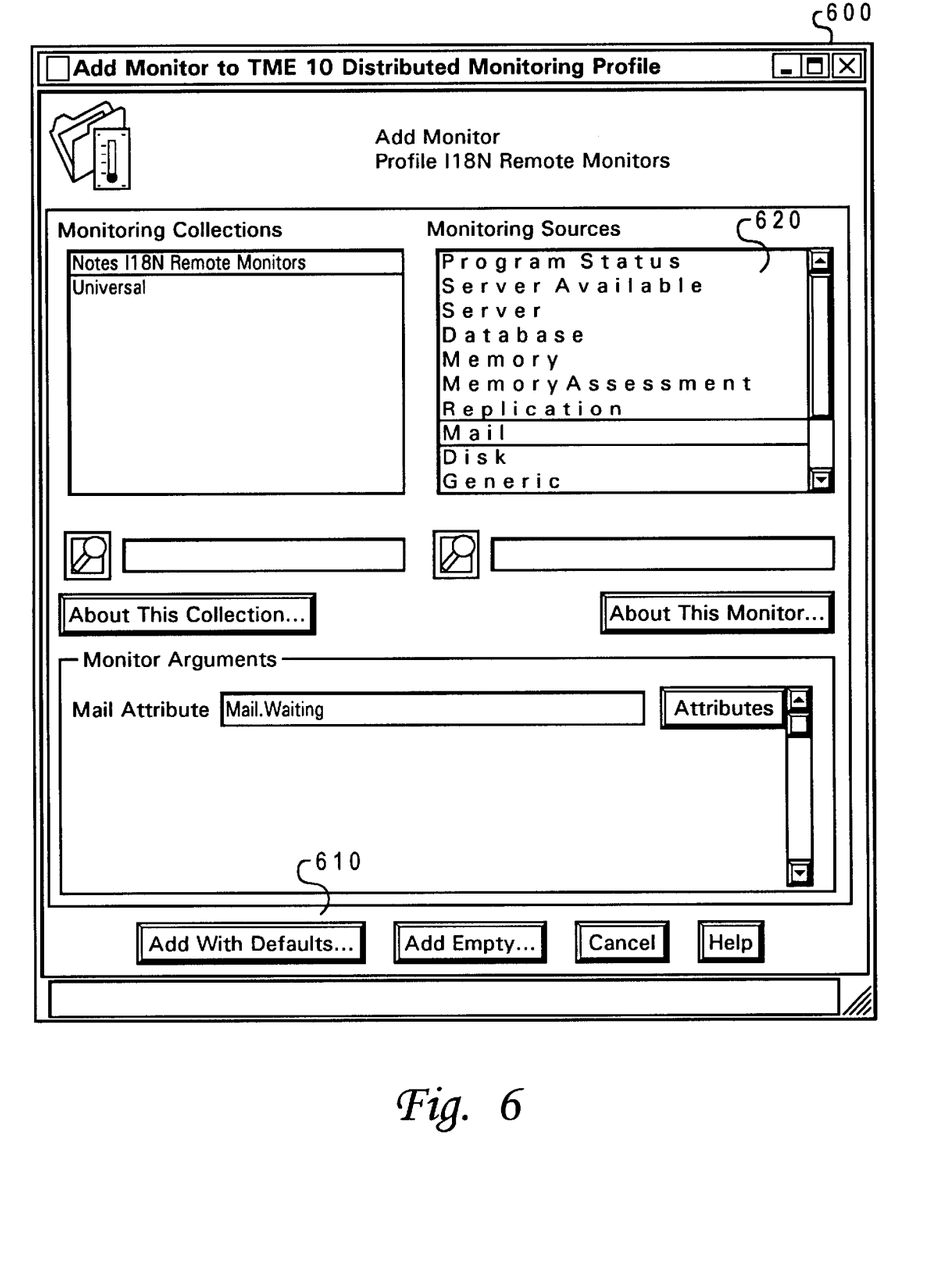
FIG. 6 is an exemplary display screen after a mock-translation process in accordance with another preferred embodiment of the invention, illustrating some errors.

This characteristic of the double-byte character sets is exploited to reveal internationalization problems. In this embodiment, instead of using placeholder characters, the original English text is replaced with the double-byte equivalent. This produces a visible text string that is twice as wide as the original text, as shown in FIG. 6. The double-wide characteristic accounts for the extra space that is typically needed for translated text. The double-wide characters are used in lieu of the table described above and referred to in the IBM National Language Design Guide: Designing Internationalized Products (IBM 4$^{th}$ Ed. 1996). FIG. 6 shows another exemplary display screen 600, which corresponds to the untranslated screen in FIG. 4. Note menu items 620; these characters are displayed as double-wide and illustrate proper mock-translation according to this embodiment. Contrast this with button text 610; this text appears as standard, single-width English text. Therefore, the software developer can tell at a glance that some text (the single-width text) has not been properly translated, and whether the translated, double-width text is properly displayed. For example, if the mock-translated text includes single-width text, this is a visual indication that the single width code may have been hard-coded in the program and was not a part of the localization file.

The displayed mock-translated text having double wide characters will visually indicate whether the text field for translation is properly aligned and formatted. Also, if part of the double-wide text is missing from view within the displayed text area, this may be a visual indication that not enough space was allocated on the displayed area for translated text. For further assurance that no truncation errors have occurred due to missing text that is not recognized by a viewer as missing, beginning and/or ending text indicators such as double-wide brackets or dashes can be used. If the ending indicator is not displayed, this is a visual indication that the text has been truncated. As such, a later actual translation of the text may not be completely visible on the screen. Likewise, beginning and/or ending text indicators interspersed between individual words or phrases may be a visual indication that the textual phrase improperly comprises piecemeal messages and is not a single message. In addition, double-byte dashes having a "5c" as the second byte, or any other character having a "5c" as one of the bytes, may be used as the beginning and/or ending indicator to further enable a visual inspection for double-byte processing problems. If such a problem did occur, the visual display would indicate unwanted characters in place of the dash or other beginning or ending indicator. Even without using a dash as the beginning or ending character, double-byte processing problems can also be visually determined since some of the double-byte characters contain a "5C" as one of the bytes.

As such, the preferred embodiment of this invention provides a mock translation environment for testing software that will be run using double-byte character sets. Since Asian countries use double-byte character sets, the translation of English (single-byte) software into Asian languages often results in many problems specific to double-byte text. By transliterating English text into double-byte characters that look like wide English characters, problems that would occur with the translation into real Asian languages can be identified early in the development/testing process by English-speaking programmers. Some of these problems include a) build process problems;
b) localization file retrieval mechanism problems;
c) presentation software problems;
d) display problems on the GUI or command line such as
  i) "hard-coded" English strings;
  ii) "expansion and alignment" errors;
  iii) missing localization files; and
  iv) piecemeal messages if beginning and/or ending characters are used; and
e) functional and display problems that often happen when the second byte of a double-byte is mistaken for a single byte.

For example, the famous "5C" problem which is often the second byte of a double-byte, yet is a backslash "\" in single-byte software.

Figure 8:
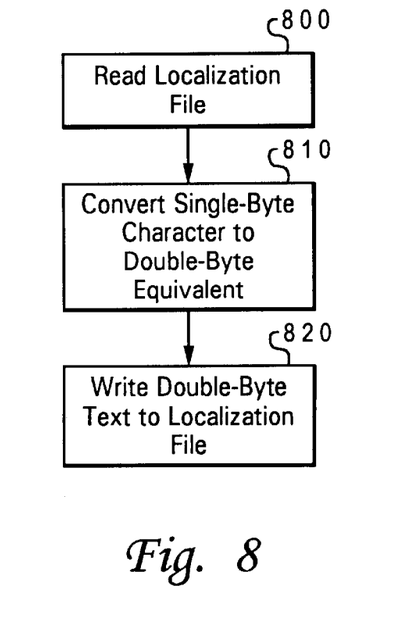
FIG. 8 depicts a flowchart of a process in accordance with another preferred embodiment of the invention.

With reference now to FIG. 8, a flowchart of a process according to the previous embodiment is shown. To test the internationalization of software which uses localization files, particularly those which will be translated to double-byte languages, the mock translation system first opens each of the localization files (step 800). Each entry in the file is then mock translated by converting each single-byte character to its double-byte, double-width equivalent (step 810). Finally, the translated entries are written back to the localization files (step 720). Now, when the software application is run for testing, the mock-translated, double-wide text will appear in place of the original text.

The mock-translation of data in the localization files can be done in many ways. For example, many localization files are stored in a compiled message catalog format called XPG4. Often, internationalized software will rely on thousands of message catalogs, and if there is an overall change to the data stored in the message catalogs, then it is important to have an automated parser system.

According to the preferred embodiment, if the message catalogs have already been compiled before the software is put through mock-translation testing, a parsing tool is provided which can decompile the message catalogs, process them, then recompile them back to the usable message catalog form. For example, in the case of XPG4-format message catalogs, at run-time the message catalogs will already have been compiled by the "gencat" program defined by X/Open. The parser will decompile the catalogs using, for example, the "dumpmsg" program available from Alfalfa Software Incorporated. The parser will then parse the decompiled file by reading each line of the file and determine whether it is a set number, a comment, a key, the only line of a message, the last line of a message, or the middle line of a message.

Then, the required insertion can be made to the beginning of every first line of a message, or whichever place is necessary. After all files are processed this way, so the parser will then recompile the message catalogs by a call to the "gencat" program, and the recompiled message catalogs are ready to run with the software application.

Of course, the processing of XPG4 files and the specific examples of compiler and decompiler programs are not limiting examples; this process may be performed on any number of localization file or message catalog file formats using many different software tools. In addition, although the preferred embodiment utilizes localization files, the invention can be implemented by parsing the program for any displayable text strings and replacing such strings with the corresponding mock-translation string as disclosed herein.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for testing a software program, comprising:
  reading a first textual data of a software program written in a first language, the first textual data at least partially comprising characters from a single-byte character set in the first language;
  replacing the characters, in the first textual data, from the single-byte character set with corresponding characters from a double-byte character set in the first language to produce a second textual data written in the first language;
  storing the second textual data in a machine-readable form; and
  displaying the second textual data in place of the first textual data on a computer display when the software is executed thereby enabling a visual inspection of the displayed textual data for errors represented by an incorrect display of the second textual data.

2. The method of claim 1, wherein the single-byte character set is an ASCII character set.

3. The method of claim 1, wherein the single-byte character set is a United States English character set.

4. The method of claim 1, wherein the machine-readable form is a localization file on a computer storage medium.

5. The method of claim 1, wherein the second textual data appears to be the same language as the first textual data, and has double-wide characters.

6. A method for testing software, comprising:
  reading translatable text written in a first language into a computer memory, the translatable text at least partially comprising characters from a single-byte character set;
  replacing, in the computer memory, the characters in the translatable text from the single-byte character set with corresponding characters from a double-byte character set to produce a mock-translated text in the first language;
  storing the mock-translated text in a computer medium; and
  displaying the mock-translated text during execution of a computer application, thereby enabling a visual inspection of the displayed mock-translated text for formatting errors represented by an incorrect display of the second textual data.

7. The method of claim 6, wherein the mock-translated text has double-wide characters, whereby the length of the space needed to display the double-wide mock-translated text is at least as great as the length of the space needed to display a translation of the text into a different language.

8. A computer system, comprising:
- a processor;
- a memory connected to be read from and written to by the processor;
- a virtual memory computer medium connected to be read from and written to by the processor; and
- a display connected to display an output from the processor, wherein the computer system performs the steps of:
  - reading translatable text in a first language from a software program into the memory;
  - replacing any single-byte characters of the translatable text with corresponding double-byte characters in the first language, to produce a mock-translated text in the first language;and
  - storing the mock-translated text in the computer medium; and
  - displaying the mock-translated text during an execution test of the software program represented by an incorrect display of the second textual data.

9. The system of claim 8, wherein the computer system further performs a step of adding at least one field boundary indicator to at least one end of the text.

10. A computer program product within a computer usable medium, comprising:
- instructions for reading translatable text from a second software program into a computer memory;
- instructions for replacing any single-byte characters of the translatable text written in a first language with corresponding double-byte characters as the first language, to produce a mock-translated text in the first language;
- instructions for storing the mock-translated text in a computer medium; and
- instructions for displaying the mock-translated text during an execution test of the second software program.

11. The method of claim 1, wherein the step of replacing the characters further comprises adding at least one field boundary indicator to at least one end of the text.

12. The method of claim 9, wherein the field boundary indicator is a double-byte dash.

13. The method of claim 9, wherein the field boundary indicator is a bracket.

14. The method of claim 9, wherein the field boundary indicator has at least one byte as a "5c".

* * * * *